United States Patent [19]
Foster et al.

[11] Patent Number: 5,174,615
[45] Date of Patent: Dec. 29, 1992

[54] MECHANICAL JOINT CONNECTOR AND JOINT EMPLOYING SAID CONNECTOR

[76] Inventors: Marion C. Foster, Rte. #4, Box 69, Woods Dr.; William M. Kittle, Jr., 310 Ridge St., both of Ringgold, Ga. 30736

[21] Appl. No.: 757,802
[22] Filed: Sep. 11, 1991
[51] Int. Cl.⁵ .............................................. F16L 25/00
[52] U.S. Cl. ................................. 285/334.2; 285/363; 285/370
[58] Field of Search ................. 285/334.2, 334.3, 379, 285/341, 363, 370

[56] References Cited

U.S. PATENT DOCUMENTS

| | | | |
|---|---|---|---|
| 390,770 | 10/1888 | Garnier et al. | 285/370 X |
| 1,913,779 | 6/1933 | Ukropina | 285/370 X |
| 2,532,891 | 12/1950 | Chupp | 285/363 X |
| 2,699,344 | 1/1955 | Bissell | 285/341 X |
| 3,507,506 | 4/1970 | Tillman | 285/334.2 X |

FOREIGN PATENT DOCUMENTS 542062  1/1977  U.S.S.R. .............. 285/334.2

*Primary Examiner*—Dave W. Arola
*Attorney, Agent, or Firm*—Kerkam, Stowell, Kondracki & Clarke

[57] ABSTRACT

A mechanical joint connector and a joint made with the mechanical joint connector are provided for use in connecting the bell ends of fittings and the like, the bell ends being of a mechanical joint-type configuration having an annular gasket-receiving recess extending into the bell from the outer flange surface of the bolt-through flange of the bell, the connector including a cylindrical sleeve and a radially extending flange, with the flange having an annular raised portion extending upwardly from upper and lower surfaces of the flange. The annular raised portions of the flange have upper surfaces which are tapered inwardly from an outer diameter toward the sleeve, such that the raised portion has its maximum height at its outer diameter. The connector and joint employ a pair of annular gaskets which have outer peripheral surfaces adapted to seat in the gasket-receiving recesses of the bell ends of the fittings, and which have inner diameters substantially equal to the outer diameter of the sleeve, and which have a back seating surface which seats against the raised portion of the gasket. The connector and gaskets are inserted between the bell ends and will extend into the bell ends when the joint is drawn up, with the gaskets seating in the gasket-receiving recesses in the bell ends and against the raised portions of the connector flange.

9 Claims, 3 Drawing Sheets

MECHANICAL JOINT CONNECTOR AND JOINT EMPLOYING SAID CONNECTOR

BACKGROUND OF THE INVENTION

1. Field of the Invention

The present invention relates to a joint connector for mechanical joints which is especially useful in joining mechanical joint fittings to one another.

2. Description of Related Art

Heretofore, various joint configurations have been proposed for joining sections of pipe to one another and to various fittings in pipeline systems. One type of joint configuration experiencing wide use in water service, gas service, and other liquid service is known in the industry as a "mechanical joint". Broadly defined, a mechanical joint is a bolted joint of the stuffing-box type, wherein each section of pipe has a bell end with a recess extending inwardly into the bell from a bolting flange on the bell end, the recess providing a seating surface for a sealing gasket, the pipe having a spigot ("plain end") at the opposite end, wherein the joint uses a separate follower gland adapted to be bolted to the flange on the bell end, to maintain the gasket in constant compression.

In many modern municipal water systems, the mechanical joint has been used less frequently in joining straight sections of pipe. The pipe-to-pipe joints are now more commonly designed to use one of several available designs of push-on restrained joints, wherein the sealing gasket is captured within the bell end. Fitting-to-pipe and fitting-to-fitting joint connections continue to employ mechanical joint connections for the most part.

Fittings employed in piping systems using mechanical joints may have bell-and-spigot ends, however, such fittings have the disadvantage that they can mate with or form a joint between only a spigot end at one side and a bell end at the other side. Further, fittings such as tees and wyes have three open ends, with crosses having four open ends, and therefore three or four incoming or outgoing lines must have the proper end configuration to be joined by the fitting.

It is also known to provide fittings to be used in systems where mechanical joints are specified wherein the fittings have mechanical joint "bell ends" at all openings. Using such fittings, the piping system must be designed to have "spigot ends" coming into the fitting. One disadvantage with this all-bell-end type of fitting is that, when it is desired to join two fittings to one another, it has generally been a requirement to employ a short section of pipe having spigot or plain ends at both ends thereof between the fittings in order to provide the proper end geometries to make up the mechanical joints. This, in effect, requires the assembly of two mechanical joints to join the two fittings to one another, which increases assembly labor and the number of piece parts which must be available, and provides an additional potential leak point in the system. Other fitting-to-fitting joint configurations have been proposed, however all require relatively complicated assemblies and do not overcome the disadvantages of requiring increased labor to assemble the joint.

It is therefore a principal object of present invention to provide a simplified connector for use in connecting together fittings or pipe having mechanical joint bell ends.

It is another important object of the present invention to provide a connector which will reduce the number of piece parts and reduce the amount of labor in assembling a joint between two mechanical joint bell ends.

It is another object of the present invention to provide a connector having the above characteristics, and wherein the connector can be used in assembling a restrained joint which is suitable for use with high internal fluid pressures.

It is a further important object of the present invention to provide a connector which will have the same joint seal integrity as the sealing gasket and follower gland of the basic mechanical joint, wherein the connector has a cylindrical sleeve and a radial flange having an annular raised portion for engaging the sealing gasket, and wherein the raised portion is tapered so as to be at a greater height above the surface of the flange at an outer periphery thereof.

SUMMARY OF THE INVENTION

The above and other objects of the present invention are realized by providing a mechanical joint connector having a hollow cylindrical sleeve of a predetermined axial length to fit inside two bell ends of mechanical joint-type fittings, the sleeve having a radially extending flange with at least one bore extending therethrough at a position adapted to be aligned with a pair of aligned bolt holes in the flanges at the ends of the fittings. The upper and lower surfaces of the flange are provided with gasket-engaging raised portions, the raised portions extending outwardly from the outer surface of the sleeve and increasing in height above said flange surfaces as the radial distance from the sleeve increases.

The gasket of the present invention may be of a standard configuration as is presently used in mechanical joints, having an inner peripheral surface defining an inner diameter sized to snugly engage the outer surface of the sleeve. A gasket is fitted over each end of the sleeve and is positioned immediately adjacent the raised portion on each side of the flange. The back face of the gasket forms a slightly acute angle with the inner peripheral surface, and at least a part of an outer surface of the gasket is tapered such that the outer diameter of the gasket decreases as the distance from the flange increases.

The assembly of a joint between two fittings having mechanical joint bell ends using the connector of the present invention involves a relatively simple procedure. Gaskets are positioned on the two sides of the connector flange adjacent the raised portions, and the connector is placed between the two bell ends of the fittings to be joined. The two ends of the sleeve are inserted into the two bell ends, and the one or more bores, preferably two or a number equal to the number of bolt holes in the fitting flanges, are aligned with the flange bolt holes. Retaining bolts and nuts are then tightened to draw up the two fitting flanges into tight engagement with the gaskets on the connector and to seat the gaskets into the recesses at the ends of the bell ends.

The profiles of the raised portions of the flanges operate to compress the gaskets into a fluid-tight seating engagement at the sleeve/flange intersection on the connector. This inwardly tapered profile also operates to force the gasket downwardly and inwardly upon the application of fluid pressure from the fluid flowing inside the fittings. The connector thus produces a seal of at least equal integrity to that of the standard mechanical joint seal.

The connector is especially well adapted to be used with fittings such as bends or angles, tees, wyes, crosses and offsets, as well as with other components found in piping systems such as valves, pumps, or hydrants, and can be used, if desired, to connect two bell ends of pipe sections having mechanical joint-type bell configurations.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment of the present invention taken in conjunction with the accompanying drawings wherein like reference characters represent like parts throughout the several views.

DETAILED DESCRIPTION OF THE DRAWINGS

Figure 1:
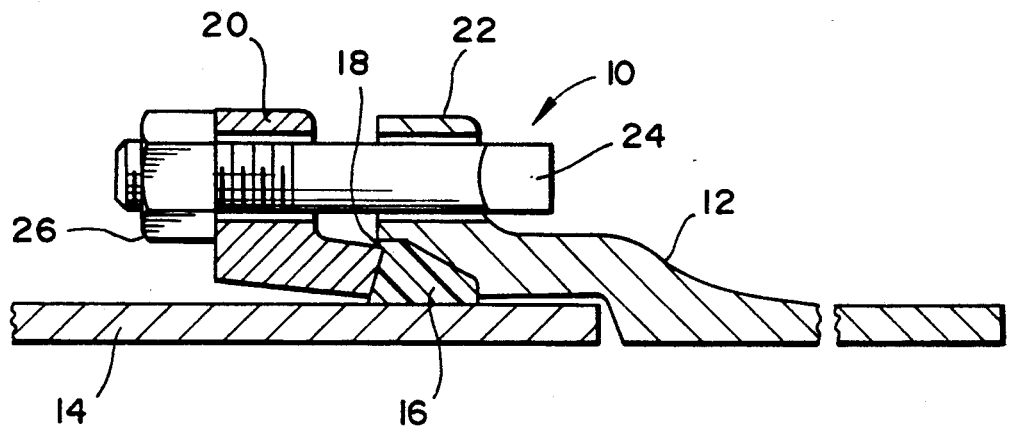
FIG. 1 a sectional view of a standard bell-to-spigot connection made with a mechanical joint as heretofore known in the art.

Referring initially to FIG. 1, a basic mechanical joint design 10 as known in the art prior to the present invention is shown, wherein a bell or socket end 12 of a pipe section or a fitting is joined in an end-to-end manner to a spigot or plain end 14 of another pipe section. In the mechanical joint, a gasket 16 is seated in an annular recess 18 disposed at the open end of the socket 12, and the gasket is retained in compression at that position by a follower gland 20 bolted to a flange 22 on the socket using a plurality of bolt 24 and nut 26 sets, the bolt shown here being a tee-bolt. The compressed gasket provides a fluid seal for the joint, and provides a minor amount of restraining force for retaining the spigot within the bell.

As noted previously, mechanical joints have enjoyed widespread use in piping systems for municipal water, natural gas, and the like. At present, the pipe section-to-pipe section connections have evolved from using a mechanical joint to using various configurations of push-on joints wherein the gasket is captively retained in a recess within the bell or socket end, and, when required, various restraint systems are used to prevent the pipe sections from separating upon application of axial thrust loads tending to separate the sections. Such joints reduce the amount of labor required, and thus reduce the cost and time, for installation of the pipeline. Mechanical joints differ from the push-on joints in that, in the mechanical joint, the gasket is not captively retained by the bell or socket end alone, relying instead on the follower gland to keep the gasket seated in the recess under compression, as the gasket-retaining recess opens to the outside of the pipe at the bolting flange 22 end of the pipe. Mechanical joints continue to be used to a great extent for fittings, such as the aforementioned bends, angles, tee, wyes and crosses, as well as for components used in a piping system, such as valves and pumps. As such, the joints connecting these fittings to one another and to pipe sections are major cost factors in pipeline installation, in that the additional labor involved is extensive compared with push-on joints, and additional parts are required as well.

Figure 2:
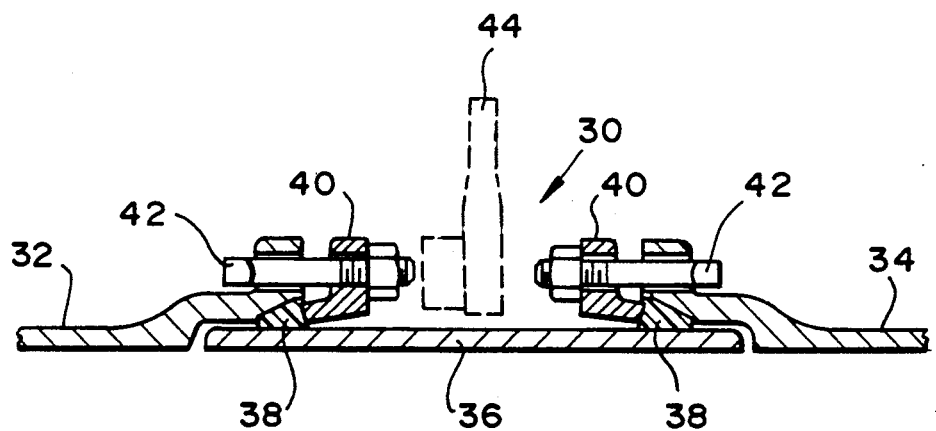
FIG. 2 is a sectional view of an example of a bell end to bell end mechanical joint connection as heretofore known in the art.
Figure 3:
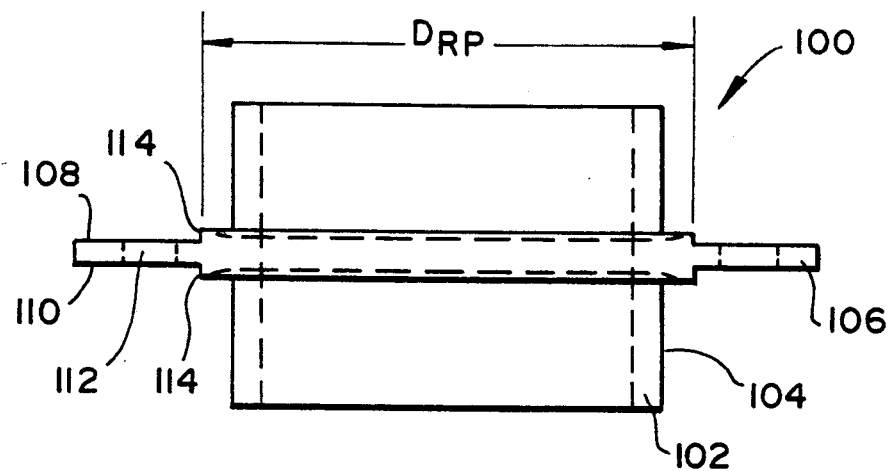
FIG. 3 is a side elevation view of the mechanical joint connector in accordance with a preferred embodiment of the present invention.

FIG. 2 represents a very simple version of an essentially non-restrained joint configuration 30 used in the prior art for joining two mechanical joint bell ends 32, 34, to one another. The two bell ends could be representative of openings on a valve and a tee, for example. It can be seen from FIG. 2 that the configuration shown therein actually requires the assembly of two mechanical joints using a short section of pipe 36 having two plain ends adapted to fit into the two bell ends. Two gaskets 38, two follower glands 40 and two bolt-and-nut sets 42 are required to assembly this joint. As can be seen by the broken line schematic representation of a socket wrench 44, the pipe section 36 in this joint configuration will also generally be required to have sufficient length to allow clearance for the socket wrench, and in many instances, the additional space required is not readily available.

There have been other socket-to-socket joint configurations proposed for use, and designed particularly to make the joint a restrained joint, but all have required the use of the follower glands and many additional piece parts or components in order to assemble the joint.

The connector 100 of the present invention, as shown in FIGS. 3-7, greatly simplifies the assembly of a joint to connect two bell ends of a mechanical joint-type bell configuration, such as would be frequently encountered in connecting two fittings to one another. The connector 100 provides this advantage while maintaining the integrity of the fluid seal normally obtained with a mechanical joint, and further provides the advantage that a restrained joint is also obtained when the joint using the connector is assembled.

The connector 100 comprises a hollow, substantially cylindrical sleeve 102 having an outer surface 104 of a diameter sized to be inserted into the sockets of two fittings. As used herein, terms such as "axial extent" and "axial direction" will be used in reference to the axis of rotation about which the cylindrical sleeve is formed. Terms such as "radially extending" and the like will be used to refer to elements extending in a direction substantially perpendicularly to the axial direction.

Extending radially outwardly from said outer surface of said sleeve is a flange 106 having substantially planar upper and lower surfaces 108, 110 respectively. The upper and lower surfaces are preferably parallel to one another, as well. As shown in FIGS. 3-7, flange 106 is disposed at the axial midpoint of the sleeve, although there may be situations in which it is preferred that the flange 106 be disposed closer to one of the ends of the sleeve 102 than to the other. The flange 106 extends radially outwardly to an extent such that at least one throughbore 112, and preferably two or more throughbores 112, can be formed in the flange in positions such that the throughbores can be aligned with bolt holes in the flanges of the sockets of the fittings to be joined.

Figure 4:
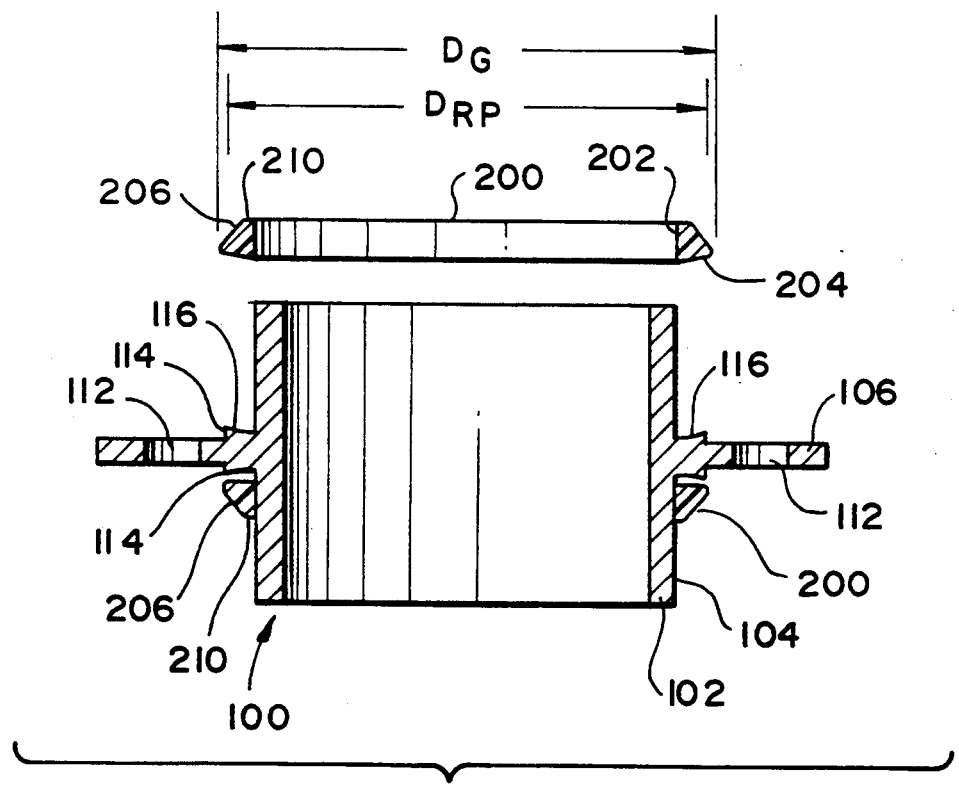
FIG. 4 is a cross-sectional view of the mechanical joint connector and the gaskets to be used in association therewith according to a preferred embodiment of the present invention.
Figure 5:
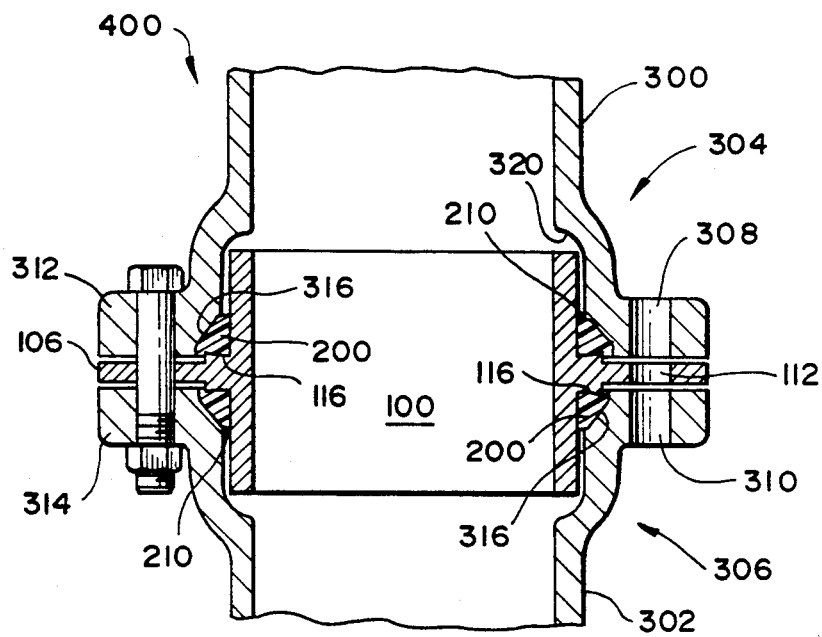
FIG. 5 is a cross-sectional view of the mechanical joint connector, gaskets, and two bell-end fittings making up a joint according to the preferred embodiment to the present invention.

Each of said upper and lower surfaces 108, 110 of said flange 106, has a raised portion 114 thereon extending away from said outer surface 104 of said sleeve 102 to a predetermined outside diameter $D_{RP}$ (FIG. 4). Also, as best seen in FIGS. 4 and 5, and in broken lines in FIG. 3, the raised portion 114 of the flange 106 increases in height, as measured from the corresponding upper or lower surface 108, 110, as the diameter of the raised portion increases. The upper surfaces of the raised portions 114 will be referred to as inwardly tapered surfaces 116 of the raised portion 114. The slightly acute angle formed by the inwardly tapered surfaces 116 of the raised portions with the outer surface 104 of the cylindrical sleeve 102 is preferably approximately the same acute angle as that of the included angle formed by an inner peripheral surface 202 and a back seating surface 204 of a standard mechanical joint gasket 200. The connector is thus preferably used with known standard mechanical joint gaskets.

The inner peripheral surface 202 of the gasket 200 is preferably sized to match as closely as possible the diameter of the outer surface 104 of sleeve 102, while still permitting the gasket 200 to be slid into position on the connector adjacent the raised portion of the flange with relatively little effort. The outer diameter $D_G$ of the gasket at its widest point is preferably slightly greater than the outer diameter $D_{RP}$ of the raised portion of the flange so that the gasket will slightly overhang the raised portion so as to ensure contact with the socket only by the gasket 200 and not by the raised portion 114 of flange 106.

Referring now to both FIGS. 4 and 5, the assembly of a joint using the connector 100 in accordance with the present invention will be discussed. The assembly procedure begins by sliding a gasket 200 onto each end of sleeve 102, into a position adjacent to the raised portions 114 of the flange 106 on both the upper and lower sides thereof, in an orientation such that an outer tapered surface 206 of the gasket 200 decreases in diameter in a direction toward the end of the sleeve 102. It will be noted at this point that the terms "upper" and "lower" are used only in reference to the orientation of the connector 100 as shown in the present drawings. The connector will be used more often in a position rotated 90° from that shown in the FIGURES, in which case the "upper" and "lower" surfaces of the flange become, in effect, a "left" and a "right" surface. Those skilled in the art will readily recognize that any of these terms are intended to represent two flange surfaces facing opposite ends of the sleeve.

The connector is then brought into position between two bell ends 300, 302 of two fittings 304, 306 or other components having mechanical joint-type bell ends, and the ends of the sleeve are inserted into the bell ends as the fittings are brought closer together. The throughbores 112 of the flange are then aligned with the bolt holes 308, 310 on the flanges 312, 314 disposed at the bell ends of the fittings, and bolts are passed through the aligned openings and nuts are threaded onto the threaded ends of the bolts in a well-known manner. The joint 400 thus formed can be drawn up by tightening the bolts and nuts in a substantially conventional manner.

The interaction of the inwardly tapered surface 116 of the raised portion 114 of flange 106, gasket 200 and the gasket-receiving recess 316 of the sockets causes the gasket 200 to compress and to tightly seat against the inner part of raised portion 114 and the part of the outer surface 104 of sleeve 102 immediately adjacent thereto. The further exposure at the tip 210 of the gasket to fluid pressure in the system adds to the compressive forces acting on the gasket to further enhance the fluid-tightness of the seal. When so constructed, the joint 400 will be of the restrained joint-type, due to the bolting together of the bell-end flanges 312, 314, and will also emulate the mechanical joint construction at each bell end without using a follower gland for each of the gaskets and without requiring numerous other parts for securing glands in place and for providing restraining means for the joints, as has been the practice prior to the present invention.

By way of non-limiting example, the typical dimensions of a connector adapted to be used with a six-inch (6") size piping system will be described. The total axial length of the sleeve will preferably be 5¼ inches, with approximately 2¼ inches extending free and clear of the raised portion 114 of the flange 106 at each end of the sleeve. This dimension may preferably be selected such that the sleeve will extend into the socket or bell end of the fitting to a position just short of a shoulder 320 provided in the bell or socket, with the shoulder defining the innermost extent of the bell or socket.

The flange 106 itself is preferably about ⅜-inch thick, while the maximum height of the raised portion above each of the upper and lower surfaces of the flange is 3/16-inch. The raised portions 114 preferably extend radially outwardly from the outer surface 104 of sleeve 102 by one-half inch (½"), and the inward taper of the raised surface reduces the height of the raised portion from the 3/16-inch maximum height at the outer diameter by 1/16th of an inch, such that the raised portion is ⅛-inch above the flange surface at its innermost point.

The sleeve preferably has a six-inch inner diameter, substantially identical to the six-inch bore of the fittings which are to be connected, and has a 6⅞ inch outer diameter, which is essentially dictated by standard socket sizes for six-inch mechanical joint fittings. The maximum outside dimension of the flange is preferably about 11¾ to 11⅞ inches, which permits the flange 106 to extend two inches radially outwardly beyond the raised portion 114 of the flange, and 2¼ inches radially outwardly of the sleeve 102. This provides adequate room to provide throughbores 112 of a ⅞-inch diameter to match that of the bolt holes on the flange of the standard six-inch mechanical joint bell or socket.

Figure 6:
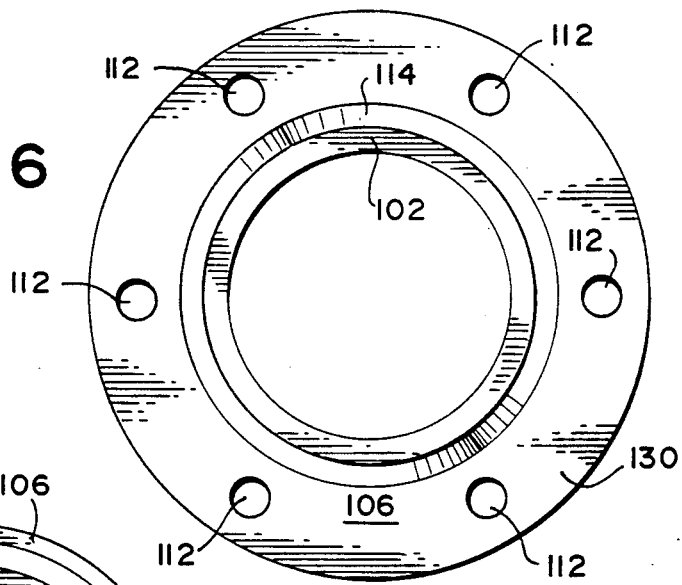
FIG. 6 is a top plan view of the mechanical joint connector showing one preferred embodiment of the flange.
Figure 7:
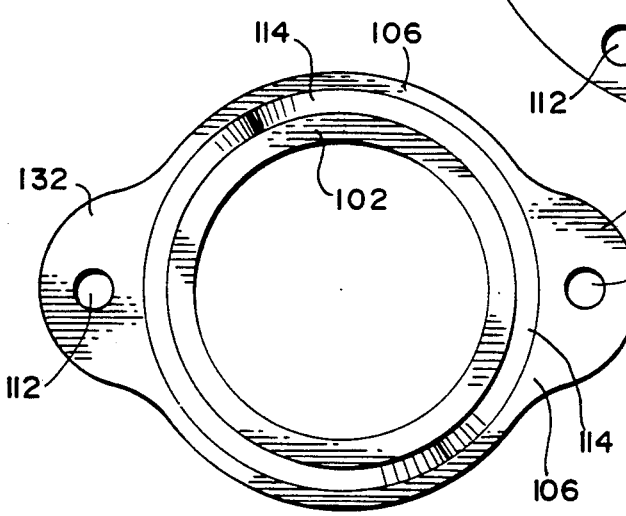
FIG. 7 is a top plan view of the mechanical joint connector showing a second alternative embodiment of the flange.

As can be seen in FIGS. 6 and 7, the flange may be either a full circular flange 130 (FIG. 6) having the preferred 11¾ or 11⅞ inch diameter and six evenly spaced throughbores 112 to correspond to the six bolt holes on the flanges of the bells or sockets of the fittings to be joined, or may alternatively have two diametrically opposed lobes 132 (FIG. 7) each having a single throughbore 112 therein. In this latter configuration, the maximum dimension across the lobes would be the preferred 11¾ to 11⅞ inches, which reduce down to an 8½ inch diameter around the remainder of the flange.

The connector and the joint employing the connector may be used in either relatively low pressure systems (approximately 50–60 psi), as well as in higher pressure systems, such as those rated at about 200 psi or above. The fittings and pipe will preferably be made of cast ductile iron when used in water service, and the connector may preferably be made of a machined stainless steel or may itself be made of ductile iron, if desired. Other corrosion resistant materials should also be suitable for use in fabricating the connector 100.

It is to be recognized that various changes and modifications to the foregoing preferred embodiments may become apparent to those of ordinary skill in the art, which changes or modifications do not depart from the spirit and scope of the present invention. Accordingly, the scope of the present invention is to be determined by reference to the appended claims.

What is claimed is:

1. A mechanical joint connector for joining the bell ends of a first fitting and a second fitting, each of said fittings having a mechanical joint configuration said connector comprising:
   a hollow, substantially cylindrical sleeve having an axial length and an outer peripheral surface having an outer diameter of a size adapted to be inserted into the interior of the bell ends of said first and second fittings to be joined;
   a flange extending radially outwardly from an exterior surface of said sleeve intermediate the ends of the sleeve, said flange having an upper surface and a lower surface which are approximately parallel to each other;
   means for engaging an elastomeric gasket comprising an annular raised portion of at least said upper surface of said flange, said annular raised portion extending outwardly from said outer peripheral surface of said sleeve, an outer diameter of said raised portion being smaller than an outer dimension of said flange, an upper surface of said annular raised portion being tapered to having an increasing height above said upper surface in a direction of increasing diameter outwardly away from said exterior surface of said sleeve;
   an annular elastomeric gasket having an inner peripheral surface having an inside diameter of substantially the same size as an outer diameter of said sleeve, said gasket having an outer diameter greater than said outer diameter of said annular raised portion, said elastomeric gasket having an outer peripheral surface adapted to be seated in a gasket-receiving recess of a bell end having said mechanical joint configuration and means for fastening said fittings together.

2. A mechanical joint connector as recited in claim 1 wherein said annular elastomeric gasket has an outer peripheral surface which tapers inwardly moving in a direction from said flange toward the end of the sleeve.

3. A mechanical joint connector as recited in claim 2 wherein said flange has at least two throughbores extending therethrough at positions where said means for fastening which includes two bolts used for bolting said two fittings together will pass through said two bores.

4. A mechanical joint connector as recited in claim 1 wherein said gasket has a back seating surface adapted to engage and seat against said annular raised portion of said flange, and wherein an included angle formed between said back seating surface and said inner peripheral surface is approximately equal to an acute angle formed between said outer peripheral surface of said sleeve and said upper tapered surface of said raised portion of said flange.

5. A joint comprising:
   a first fitting having a first bell end and a second fitting having a second bell end, each of said first and second bell ends having a radially inwardly tapering gasket-receiving recess extending axially inwardly from an outer flange surface of each of said bell ends and conforming to a mechanical joint configuration;
   a connector comprising a cylindrical hollow sleeve of an axial length sufficient to extend into both said first and second bell ends, the connector having a radially outwardly extending flange disposed along an axial extend of said sleeve, wherein said flange has an upper planar surface and a lower planar surface, and wherein each of said upper and lower surfaces has an annular raised portion, an outer diameter of each of said annular raised portions being smaller than an outer dimension of said flange, said annular raised portions each having an upper surface which is inwardly tapered toward said sleeve;
   a first and a second elastomeric gasket, an outer peripheral surface of each of said gaskets having a shape corresponding substantially in geometry to said gasket-receiving recesses, and an inner peripheral surface of said gasket defining an inner diameter substantially equal to an outer diameter of said sleeve each of said gaskets having an outer diameter greater than said outer diameter of said annular raised portions; and
   means for securely fastening said first fitting to said second fitting.

6. A joint as recited in claim 5 wherein said gasket has a back seating surface adapted to seat against said raised annular portion of said flange, and wherein an included angle formed between said back seating surface and said inner peripheral surface is approximately equal to an acute angle formed by an outer surface of said sleeve and said upper tapered surface of said raised portion of said flange.

7. A joint as recited in claim 6 wherein said fastening means for said fittings comprises a bolting flange disposed of each of said first and second bell ends, wherein said bolting flanges contain a plurality of bolt holes extending therethrough, and wherein said flange of said connector has at least one throughbore disposed at a location which is aligned with a pair of bolt holes of said first and second bell ends.

8. A joint as recited in claim 7 wherein said flange of said connector has a pair of diametrically opposed lobes, wherein each of said lobes contains a throughbore.

9. A joint as recited in claim 7 wherein said flange of said connector has an outer diameter substantially equal to an outer diameter of said bell end flanges of said fittings, and said connector flange has an equal number of throughbores as said flanges have bolt holes, said throughbores being disposed at the same spacings and positions as said bolt holes.

* * * * *

UNITED STATES PATENT AND TRADEMARK OFFICE
CERTIFICATE OF CORRECTION

PATENT NO. : 5,174,615

DATED : December 29, 1992

INVENTOR(S) : Marion C. FOSTER, ET AL

It is certified that error appears in the above-identified patent and that said Letters Patent is hereby corrected as shown below:

Column 7, line 29 [claim 1, line 16]: delete "of" and insert -- on --.

Column 8, line 16 [claim 5, line 13]: delete "extend" and insert -- extent --.

Column 8, line 46 [claim 7, line 3]: delete "of" (first instance) and insert -- on --.

Signed and Sealed this

Twenty-sixth Day of October, 1993

Attest:

BRUCE LEHMAN

Attesting Officer

Commissioner of Patents and Trademarks